UNITED STATES PATENT OFFICE.

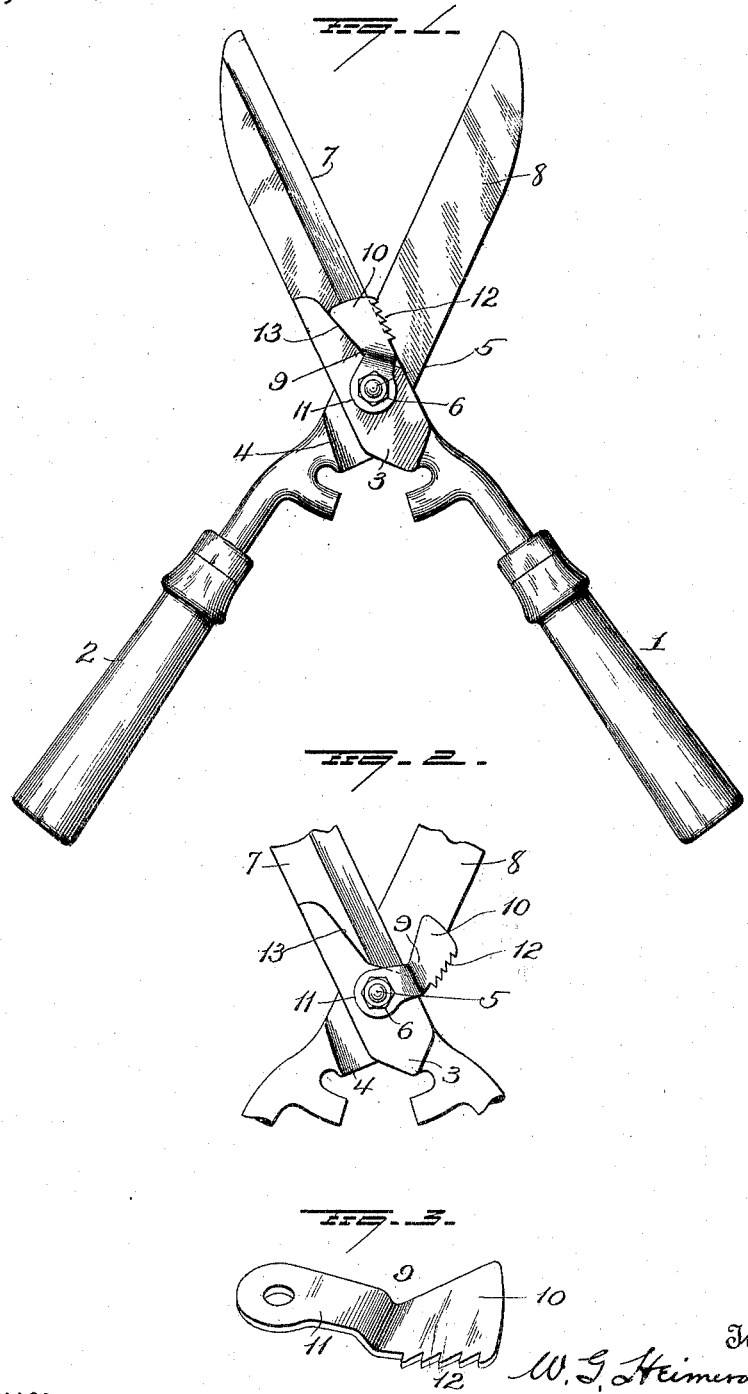

WILLIAM GLOCK HEIMERDINGER, OF LOUISVILLE, KENTUCKY.

ATTACHMENT FOR SHEARS.

1,321,825.　　　　　Specification of Letters Patent.　　Patented Nov. 18, 1919.

Application filed February 21, 1919. Serial No. 278,361.

*To all whom it may concern:*

Be it known that I, WILLIAM G. HEIMERDINGER, a citizen of the United States, and a resident of Louisville, in the county of Jefferson and State of Kentucky, have invented certain new and useful Improvements in Attachments for Shears; and I do hereby declare the following to be a full, clear, and exact description of the invention, such as will enable others skilled in the art to which it appertains to make and use the same.

This invention relates to improvements in shears and more particularly to an improved attachment for hedge and pruning shears,— one object of the invention being to provide a simple device which may be easily and quickly attached to shears and operate effectually to prevent the twig or branch being cut, from slipping along the cutting edges especially when such twig or branch is comparatively large or very hard.

A further object is to provide an attachment for the purpose stated, which shall avoid necessity for notching the blades of the shears and which may be readily moved out of the way when it becomes necessary to sharpen the shears.

With these and other objects in view, the invention consists in certain novel features of construction and combinations of parts as hereinafter set forth and pointed out in the claims.

In the accompanying drawings; Figure 1 is a view showing the application of my improvements; Fig. 2 is a view showing the position which the attachment may be made to assume when the shears are to be sharpened, and Fig. 3 is a separate view of the attachment.

1, 2 represent the handle portions of hedge or pruning shears, having jaws 3, 4, pivotally connected by a pivot pin 5, one end of which latter may be threaded to receive a nut 6. The jaws 3, 4, are formed to receive the butt ends of the blades 7, 8, of the shears.

For the purpose of preventing slipping, especially when the shears are employed in cutting comparatively large or tough twigs or branches, I attach to the shears a device 9 which shall be so located as to occupy a position at or near the apex formed by the blades when the tool is open.

The device 9 may be made of sheet metal and comprises a body portion 10 and an arm 11,—the latter being bent outwardly from the body portion so as to be offset therefrom and adapted to lie flat against the outer face of the jaw 3, while the body portion 10 lies against the outer face of the blade 7 near the butt end thereof. The body portion 10 of the device is provided at one edge with teeth or serrations 12, which project slightly beyond the cutting edge of the blade 7. The arm 11 of the device is perforated for the passage of the pivot pin 5 and the device is held in place by the nut 6 on said pivot pin. The body portion of the device is so shaped that its rear edge will lie close to the shoulder 13 formed by the jaw 3, so that said shoulder will constitute an abutment which will receive back pressure on the device 9 when the tool is in use, and thus the device will be held properly in place with the teeth projecting slightly beyond the cutting edge of the blade.

It is apparent that engagement of the teeth 12 with the twig or branch to be cut will prevent the same from slipping when the initial portion of the cut is being made and hence, with the use of my improvement, much labor and time will be saved and the annoyance caused by the slipping of the twigs or branches will be obviated.

By loosening the nut 6, the device 9 may be swung to the position shown in Fig. 2 so as to be out of the way when the blades are to be sharpened.

My improved attachment may be easily and quickly applied to the shears; may be cheaply manufactured, and is effectual in the performance of the function for which it is intended.

Slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. A sheet metal attachment for shears, comprising a body portion having a toothed edge and an arm offset from said body portion and adapted for connection with the shears, the shoulder formed by offsetting the arm from the body portion of the attachment, adapted to normally rest against a shoulder on the blade, whereby the toothed edge of the attachment is caused to overhang the cutting edge of the blade.

2. An attachment for shears comprising a device having a toothed edge, and a hole near one end for the passage of the pivot pin connecting the shear blades, the said device being free at its outer end and provided intermediate its ends with a shoulder adapted to bear against a shoulder on the shear blade, whereby the toothed edge of the device will be held projected over a portion of the cutting edge of the blade.

3. The combination with the handle members and blades of shears one of the latter having a shoulder adjacent the pivot pin connecting the blades, of an attachment comprising an arm pivotally mounted on said pivot pin and having a body portion adjacent to one of the blades near the butt thereof, said body portion having teeth adapted to project beyond the cutting edge of the blade, and the said attachment being free at its front end and adapted to be supported in operative position by the shoulder on the blade.

4. The combination with the handle members and blades of shears and a pivot pin connecting said handle members, of an attachment comprising a device having an arm pivoted on said pivot pin and having a body portion adjacent to one of the blades of the shears near the butt end and provided with teeth at its front edge, and an abutment for the rear edge of the device, the said attachment being free at its outer end to permit it to be turned on its pivot to expose the portion of the cutting edge normally covered by the same.

5. The combination with handle members of shears, blades rigid with said members and a pivot pin connecting the blades, one of said blades having a shoulder adjacent the pivot pin, of a device disposed adjacent the blade having the shoulder, and provided with an offset portion pivotally mounted on the pivot pin, the said device having a toothed front edge and supported at its offset portion by the shoulder on the blade.

In testimony whereof, I have signed this specification in the presence of two subscribing witnesses.

WILLIAM GLOCK HEIMERDINGER.

Witnesses:
 EDWARD D. WHITE,
 GEORGE CARDIN.